UNITED STATES PATENT OFFICE.

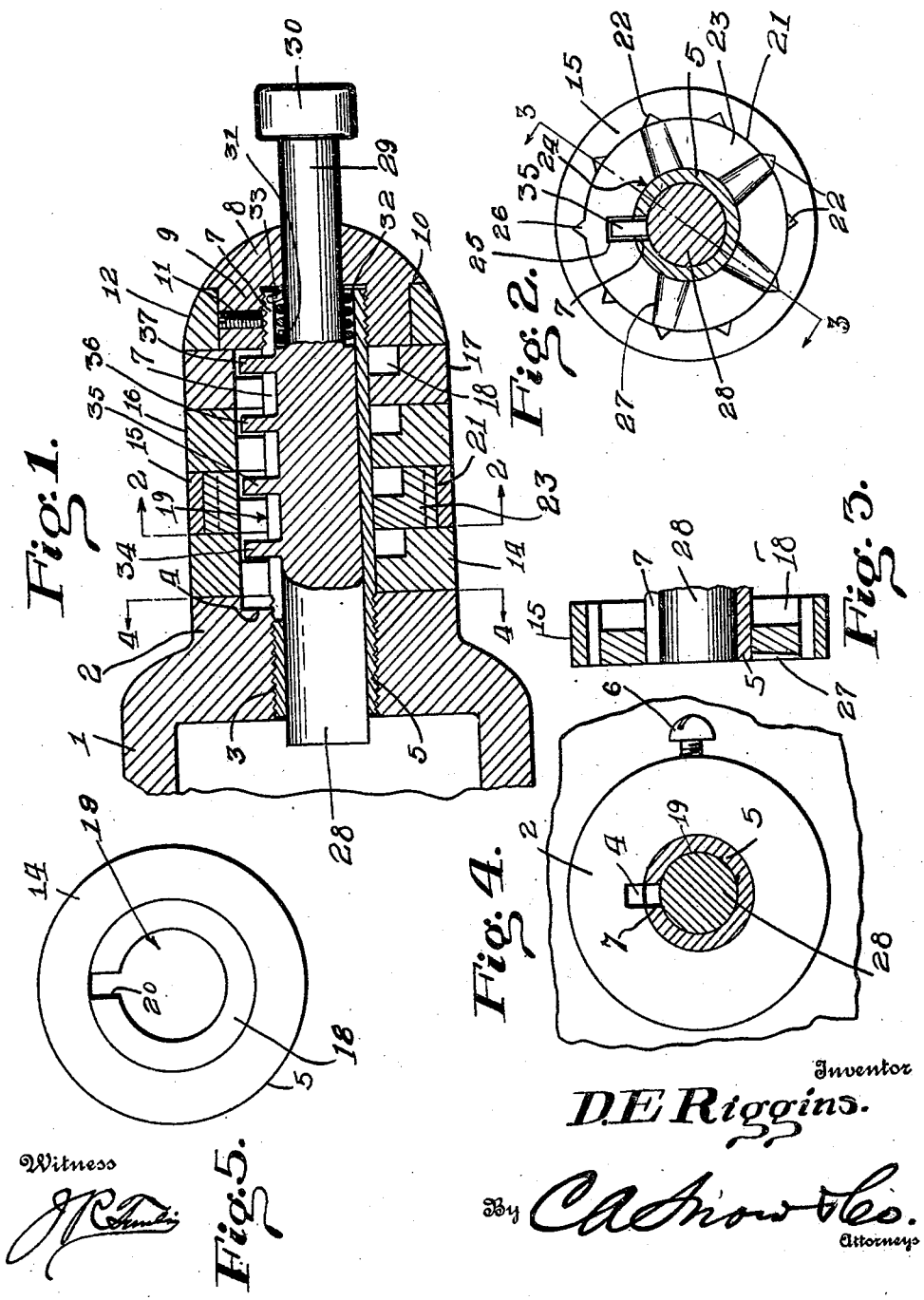

DAVID E. RIGGINS, OF PERRY, OKLAHOMA.

PERMUTATION LOCK.

1,413,427.  Specification of Letters Patent.  Patented Apr. 18, 1922.

Application filed May 7, 1920. Serial No. 379,554.

*To all whom it may concern:*

Be it known that I, DAVID E. RIGGINS, a citizen of the United States, residing at Perry, in the county of Noble and State of Oklahoma, have invented a new and useful Permutation Lock, of which the following is a specification.

The device forming the subject matter of this application is a permutation lock of that general type shown in my prior Patent No. 1,330,394, issued to me on the 10th day of February, 1920, for sundry improvements in a locking means.

The present invention aims to advance the prior art, as represented in my patent, in three specific ways: first, by so constructing the rotatable tumblers of the lock that the number of tumblers may be reduced: secondly, by providing novel means whereby the locking bolt will be normally retracted: thirdly, to provide novel means whereby the combination may be changed readily.

The invention aims to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in longitudinal section, a device constructed in accordance with the invention, parts being shown in elevation; Figure 2 is a cross section on the line 2—2 of Figure 1; Figure 3 is a section on the line 3—3 of Figure 2; Figure 4 is a section on the line 4—4 of Figure 1; and Figure 5 is an elevation showing one of the tumblers.

The device forming the subject matter of this application is adapted to be used for locking a portion of an automobile, so that the vehicle cannot be operated. The lock may be applied to the steering column, to the gear case, or elsewhere, and, since the structure is of general application, the numeral 1 may be stated to designate generally a support or casing provided with an outstanding boss 2 having a threaded bore 3. There is a seat 4 in the outer end of the boss 2, the seat communicating with the bore 3. One end of a tube 5 is threaded into the bore 3 and is held in place by a set screw 6 threaded into the boss 2, transversely thereof. The tube 5 has a longitudinal slot 7 alined with the seat 4 in the boss 2. A cap 8 is threaded on the outer end of the tube 5 and has a reduced neck 9 defining a shoulder 10. A screw 11 is threaded into the neck 9 and is engaged at its inner end in the slot 7 of the tube 5 to hold the cap against rotation. A ring 12 surrounds the shoulder 10 and houses the outer end of the screw 11, the construction being such that the lock cannot be taken apart from its outer end.

Annular tumblers 14, 15, 16 and 17 are provided. The tumblers 14, 16 and 17 are supplied, each, in one of its side faces, with an annular recess 18 and an opening 19, there being a notch 20 in the tumbler, the notch communicating with the opening. The tumbler 15 is provied with an opening 21 communicating with circumferentially spaced seats 22. A ring 23 is located in the opening 21 of the tumbler 15 and is supplied with an opening 24, corresponding to the openings 19 of the other tumblers, the ring having a notch 25, corresponding to the notch 20. The ring 23 is supplied on its periphery with a tooth 26 adapted to be engaged in any of the seats 22 of the tumbler 15. The ring 23 and the tumblers 14, 16 and 17 may be supplied with the usual dummy notches 27, rendering difficult, an unauthorized opening of the lock by sound. The function of the notches 27 is well understood by locksmiths and others skilled in the art, and need not be dilated upon. The openings 19 and 24 of the various tumblers receive the tube 5, the tumblers being rotatable on the tube.

A locking bolt 28 is mounted for right line reciprocation in the tube 5 and includes a reduced stem 29 slidable in the cap 8. A head 30 is mounted on the outer end of the stem and is held thereon by riveting, or by providing a driving fit between the head and the stem. This detail is of no importance, in a patentable sense, it being necessary or desirable, merely, that the head 30 being fastened on the stem 29 in some way so that the head cannot be removed readily. There is a lug 31 on the stem 29 of the locking bolt. A retractile spring 32 surrounds a portion of the stem 29 of the locking bolt, the inner terminal convolution of the spring being engaged behind the lug 31, and the outer terminal convolution of the spring ending in a hook 33 engaged in a notch in the end of the sleeve 5. Obviously, the spring 32 constitutes a means for retracting the locking bolt as distinguished from advancing the bolt as shown in my earlier patent above alluded to. The locking bolt 28 has fingers 34, 35, 36 and 37 mounted to move in the slot 7 of the tube 5 and to cooperate with the respective tumblers, in a way to be pointed out hereinafter.

In Figure 1 of the drawings, the locking bolt 28 is shown in retracted or unlocked position. Since the tumblers, such as the tumbler 14 of Figure 5, are provided with the recesses 18, adapted to receive the fingers of the locking bolt, such as the finger 34, it will be obvious that, with the bolt in unlocked position, any tumbler may be rotated. This observation is not true of the device shown in my former patent, in that when the locking bolt is retracted, certain of the tumblers are held against rotation. The provision of the recesses 18 in the device forming the subject matter of this application, makes it possible to obtain all of the advantages of the structure shown in my prior patent, and, at the same time, to use fewer tumblers.

When all of the notches 20 and 25 in the various tumblers are lined up, then the locking bolt 28 may be slid to the left from the position of Figure 1, the finger 34 being received in the seat 4 of the boss 2, the finger 35 engaging behind the ring 23 of the tumbler 15, the finger 36 engaging behind the tumbler 16, and the finger 37 engaging behind the tumbler 17, when the various tumblers are rotated. When the locking bolt is advanced as aforesaid, the finger 34 is received in the seat 4 of the boss 2 of the support 1. Consequently, the tube 5 cannot be threaded out of the bore 3 of the support 1 until the bolt 28 is in retracted or unlocked position.

The ring 23 may be shifted circumferentially in the tumbler 15, the tooth 26 being shifted from one of the seats 22 to another. Thus, the combination can be changed.

Owing to the particular way in which the spring 32 is connected with the stem 29 of the locking bolt 28 and with the outer end of the tube 5, the spring serves to retract the locking bolt instead of to advance the locking bolt as in my former patent.

Having thus described the invention, what is claimed is:—

In a permutation lock, a support; a tube mounted in the support and provided with a slot; a cap on the tube; a locking bolt slidable in the tube and having fingers movable in the slot, the bolt being provided with a reduced stem slidable in the cap; a retractile spring within the tube and disposed about the stem, one end of the spring being attached to the bolt and the other end of the spring being attached to the tube, whereby the spring will retract the bolt; tumblers journaled for rotation about the tube and located between the support and the cap; a circumferentially shiftable ring in one tumbler, the ring and said tumbler having interengaging elements whereby the ring may be held in adjusted positions, the ring and the other tumblers having notches adapted to be alined for the passage of the fingers, the ring and said other tumblers being provided with side recesses in which the fingers are received when the tumblers are rotated.

In testimony that I claim the foregoing as my own, I have hereto affixed my signature in the presence of two witnesses.

DAVID E. RIGGINS.

Witnesses:
 FRED C. SEIDT,
 A. M. CROWDER.